United States Patent
Gorbadey

(10) Patent No.: US 7,823,014 B2
(45) Date of Patent: Oct. 26, 2010

(54) GORBADEY'S METHOD FOR ENSURING THE RELIABLE OPERATION OF THE PROGRAM COMPUTING MEANS

(76) Inventor: Iakov Arkadievich Gorbadey, Zelenograd. korp. 1804a, 82, Moscow, 124365 (RU)

( * ) Notice: Subject to any disclaimer, the term of this patent is extended or adjusted under 35 U.S.C. 154(b) by 441 days.

(21) Appl. No.: 12/015,446

(22) Filed: Feb. 6, 2008

(65) Prior Publication Data
US 2008/0288817 A1 Nov. 20, 2008

Related U.S. Application Data

(63) Continuation of application No. PCT/RU2006/000693, filed on Dec. 25, 2006.

(30) Foreign Application Priority Data

Dec. 27, 2005 (RU) ................. 2005140748

(51) Int. Cl.
*G06F 11/00* (2006.01)
(52) U.S. Cl. .................... 714/15; 714/16; 714/17; 714/21; 714/38; 714/49
(58) Field of Classification Search .......... 714/15, 714/16, 17, 19, 20, 21, 37, 38, 49, 50, 51, 714/54, 55
See application file for complete search history.

(56) References Cited

U.S. PATENT DOCUMENTS

| | | | | |
|---|---|---|---|---|
| 5,740,360 A | * | 4/1998 | Huckstepp | 714/50 |
| 5,911,040 A | * | 6/1999 | Hirayama et al. | 714/38 |
| 5,944,840 A | * | 8/1999 | Lever | 714/34 |
| 5,966,530 A | * | 10/1999 | Shen et al. | 712/244 |
| 5,978,939 A | * | 11/1999 | Mizoguchi et al. | 714/55 |
| 6,170,068 B1 | * | 1/2001 | Liddell et al. | 714/49 |
| 6,374,364 B1 | * | 4/2002 | McElroy et al. | 714/10 |
| 6,401,216 B1 | * | 6/2002 | Meth et al. | 714/16 |
| 6,883,170 B1 | * | 4/2005 | Garcia | 718/1 |
| 7,243,266 B2 | * | 7/2007 | Hiramatsu et al. | 714/37 |
| 7,302,477 B2 | * | 11/2007 | Kline | 709/223 |
| 7,313,727 B2 | * | 12/2007 | Cabrera et al. | 714/21 |
| 7,398,423 B2 | * | 7/2008 | Reaume et al. | 714/23 |
| 7,519,867 B2 | * | 4/2009 | Grey | 714/38 |

(Continued)

FOREIGN PATENT DOCUMENTS

RU    2011216 C1    4/1994

(Continued)

OTHER PUBLICATIONS

International Search Report from International Application No. PCT/RU2006/000693, filed Dec. 25, 2006, mailed on May 24, 2007.

(Continued)

*Primary Examiner*—Joshua A Lohn
(74) *Attorney, Agent, or Firm*—Houston Eliseeva, LLP

(57) ABSTRACT

The invention relates to computer engineering, and its usage ensures the possibility to recognize types of failures occurring during operation of the program computing means, and to respond respectively for a failure of each type. The failures can include errors in storing the core memory content, control transfer to wrong command errors, and errors relating to various time interruptions during a program run.

5 Claims, 5 Drawing Sheets

U.S. PATENT DOCUMENTS

| | | | |
|---|---|---|---|
| 7,523,353 B2 * | 4/2009 | Roth | 714/42 |
| 7,669,182 B2 * | 2/2010 | Garcia | 717/108 |
| 2002/0178209 A1 | 11/2002 | Boettcher | |
| 2004/0153763 A1 * | 8/2004 | Grochowski et al. | 714/17 |
| 2004/0153834 A1 * | 8/2004 | Oshima et al. | 714/38 |
| 2005/0273655 A1 * | 12/2005 | Chow et al. | 714/16 |
| 2006/0271820 A1 * | 11/2006 | Mack et al. | 714/17 |

FOREIGN PATENT DOCUMENTS

| | | |
|---|---|---|
| RU | 2050588 C1 | 12/1995 |
| RU | 2066877 C1 | 9/1996 |
| RU | 2094842 C1 | 10/1997 |

OTHER PUBLICATIONS

International Preliminary Report on Patentability, dated Jul. 1, 2008, from International Application No. PCT/RU2006/000693, filed Dec. 25, 2006.

* cited by examiner

GORBADEY'S METHOD FOR ENSURING THE RELIABLE OPERATION OF THE PROGRAM COMPUTING MEANS

RELATED APPLICATIONS

This application is a Continuation of PCT application serial number PCT/RU2006/000693 filed on Dec. 25, 2006 which is incorporated herein by reference in its entirety.

This application claims priority to Russian Patent Application No. 2005140748, filed on Dec. 27, 2005, which is incorporated herein by reference in its entirety.

BACKGROUND OF THE INVENTION

This invention relates to the computer engineering, and particularly to the method for ensuring the reliable operation of the program computing means.

The reliable operation of any computing means utilizing a software is an actual question up to now. Numerous implementations made in this direction are already known.

Thus, the RU 2011216 C1 (15 Apr. 1994) describes an apparatus for managing a control computing machine, which apparatus manages, while proceeding to an interruption processing, a timing chart portion that is common for external and internal interruptions.

The RU 2050588 C1 (20 Dec. 1995) describes the method for managing and debugging real time programs and the apparatus for implementing thereof. This method has four modes for localizing an error, each of which modes comparing an address of some cell with the address set with tumblers.

The RU 2066877 C1 (20 Sep. 1996) describes the apparatus for managing an electronic computer detecting the control altering errors by comparing the real addresses with admissible ones.

The RU 2094842 C1 (27 Oct. 1997) discloses another apparatus for managing a control computer, which apparatus manages the correctness in addressing modules of said computer, the correctness in switching the sequence of interrupt service routines, and correctness in proceeding to a new linear program part. The RU 2001118437 A1 (10 Jun. 2003) describes the method for sharing time of the central processing unit between tasks in computerized systems for controlling technological processes using the planning management file. In this method which is based on the allocation of priorities in processing the jobs, a cycle of job switch sequence in accordance with their ranking defined yet at the design stage is assigned.

The U.S. Pat. No. 5,966,530 A (12 Oct. 1999) discloses the method for restoring the instruction boundary machine states. In this method, each instruction, at the moment of its issue, is assigned an identifying mark bound with the location in the memory. Data on this location is upgraded in response to instruction activity status changes.

The U.S. Pat. No. 6,374,364 B1 (16 Apr. 2002) describes the fault tolerant computing system using instruction counting, wherein an interruption occurs after a predetermined number of instructions have been executed.

The US 2002/0178209 A1 (28 Nov. 2002) discloses the method for determining the load of a computing element, wherein the program is subdivided into several tasks, and time intervals between interruptions are selected such that at least one task is started and ended during the time interval.

All these known methods ensure some increase of the program computing means operation reliability, however, each being directed onto solving some particular task.

The analogue closest to the claimed invention is described in the U.S. Pat. No. 5,911,040 A (8 Jun. 1999). The computing system disclosed in this document is fault tolerant due to the fact that, upon detecting an error while running the program, a step of returning to the previous checkpoint is carried out, and the program restarts from this checkpoint, the checkpoint set being held in the processor memory. However, this method does not ensure the required reliability too, since it does not recognize types of failures (errors), and hence it is not able to correct those failures (errors) in various manners depending on the type thereof.

SUMMARY OF THE INVENTION

The object of this invention is in developing such a method for ensuring a reliability in the operation of any program computing means (PCM), which could avoid disadvantages of analogues existing in the background, i.e., would ensure a possibility to recognize timely the failures occurred during the PCM operation, and to respond accordingly to the failure of each type.

In order to solve the set task and to achieve the indicated technical result, the present invention provides a method for ensuring the reliable operation of the program computing means (PCM) including at least: a processor operating under the control of a predetermined operating system and intended for processing data under the control of at least one program being executed; a core memory intended for storing said at least one program being executed and data being processed; time interval sequence generators; the method comprising steps of: defining in advance at least one state of said program being executed different from the start and end states thereof, which state being hereinafter referred to as the restart point and intended for resuming the operation of said program being executed after a failure during execution thereof; when executing, in the PCM, said program being executed, in the case of failure occurrence, determining, due to respective monitoring, the following failures in the PCM operation: a) an error in storing the core memory content, which error being hereinafter referred to as the M-type interruption and determined by checking a respective part of the core memory content; b) a control transfer to a wrong instruction, which transfer being hereinafter referred to as the C-type interruption and determined by monitoring the correctness of every control transfer in the processor; and c) various time interruptions being hereinafter referred to as the T-type interruptions determined by monitoring a run duration of a respective part of the program being executed and predetermined operating system; while processing a respective one of said interruption types and upon occurrence of anyone of the failures being recognizable, in the case of allowable conditions for continuing the operation, restarting the execution of said program being executed beginning with the nearest restart point of said program being executed preceding to this interruption; if the determined failure appears again during the following attempts to restart said program being executed, stopping the execution of the program being executed and recording the presence of the respective failure during execution of the program being executed.

Other features and advantages of the claimed method would be obvious from the following specification and appended claims.

BRIEF DESCRIPTION OF THE DRAWINGS

The present invention is illustrated with the drawings, where similar elements are denoted with the same reference numbers, and wherein.

DETAILED DESCRIPTION OF THE PREFERRED EMBODIMENTS

Figure 1:
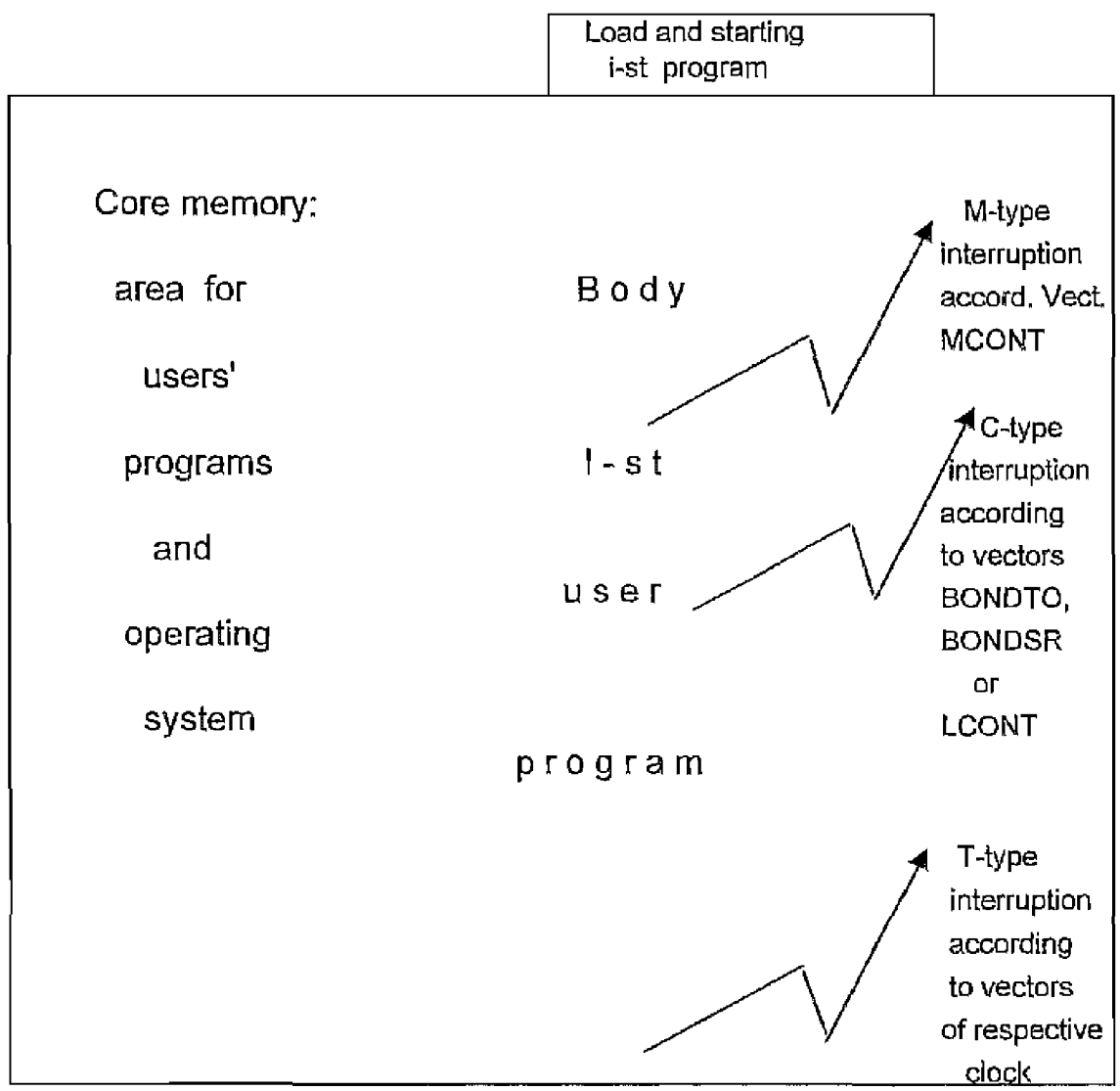
FIG. 1 illustrates the general mechanism of the PCM memory operation.

Prior to describing the proposed method, it is necessary to make some explanations.

During the operation of any system being the program computing means (PCM) or in which the PCM is employed (as known from the background, e.g., from the closest analogue, the U.S. Pat. No. 5,911,040 A), it is necessary to recognize, automatically and as early as possible, an occurred failure of the computing process in such a system. Otherwise, such unrecognized failure leads, in short time (not more than one millisecond) and with the probability close to 1, to a fault of the whole system.

Any computing process in any PCM, during normal behavior of the process, is set in an arbitrary time moment by condition of programs and data recorded in the PCM memory at the time of executing the current instruction, and by correct execution of this instruction by the whole aggregate of devices in the system. Hence it follows that for any deviation from the normal execution, whether due to failures in the hardware, or due to errors in initial data or program, the recognition of such deviation is realized formally in a certain cause-and-effect combination of only three different forms:

nonconservation of the memory content (M-type failure, from the word "Memory"), —this is, e.g., a hardware failure or core memory fault, which is determined by the parity check unit when executing the current instruction, or an unauthorized record into the core memory, or a nonconservation of register state of some external device;

wrong control transfer in the processor (C-type failure, from the word "Control"), —this is, e.g., a false detection or false skip of the interruption from the external device, or an unauthorized control transfer into an arbitrary address of the core memory;

illegal operation time (T-type failure, from the word "Time"), —this is, e.g., an inadmissible quick or slow response of an external device, or a program cycling, or a processor halt.

The proposed invention just monitors failures of all three types in order to ensure a quick localization of disturbance in the system and isolation the system from the disturbance influence. For this purpose, excess system resources are used. In a single-processor system having the memory page organization, such resources are:

for the processor, —an excess of the available processor time relative to the time required for executing the main system tasks (the single resource of the processor, which is created by the processor's relative speed), for the core memory, —the per-page equivalence or repeatability of programs or data within saving the inter-page relations.

The general form of excessiveness of any external (for the given system) device or subsystem of an underlying layer (in the given system) is as follows: the presence of one or more stable states of the external device or subsystem, the emergency transfer, as quick as possible, into the nearest stable state when needed, and the possibility for continual repetitions in the case of failed attempts to use the external device or subsystem from the given system's end.

The proposed invention is based on the usage of said excessive resources, the usage occupying only several percents of the PCM processor time and memory. One would speak conditionally about creating the M-service, C-service, and T-service of the reliability in the PCM.

The concept of the M-service is based on designing a recognizer for coinciding the essential parts of the real value in the core memory and registers of external devices to the required (theoretical) value of the same parts in respective time moments. To realize such recognizer of maintenance of the core memory state, each memory page should be divided into two parts: monitored and unmonitored. Any constant information, i.e., program bodies or data, not varying its value in the course of time greater than some predetermined characteristic value, should be situated in the beginning of the core memory page (the monitored part), and intermediate results having a varying content should be situated in the end of the page or in separate pages (the unmonitored part).

In the first words of the page, the length of the constant part of this page and the supplement to the checksum of this constant part should be located. Then, upon interruption while checking by the parity check unit or in another hardware-software conflict, as well as periodically, a subroutine dedicated specifically for this purpose could determine an occurrence of the M-type failure and give the information necessary for taking care on regenerating or replacing this page.

The concept of the C-service is based on determining the loss of control, which leads to a wrong control transfer.

In order to determine the loss of control, which leads to the control transfer into the unused memory, it is necessary to record into all unused words of pages, as well as into the zero and last words of the used pages the trap instruction like CALL LCONT for calling the system subroutine intended for analyzing the loss of control. Then, in the case of accidental control transfer into such addresses, the call to this system procedure will occur with the indication of the possible conflict place. Thus, direct linear control transfers from the current page into the next one are prohibited.

In the case of the loss of control, which leads to the control transfer into the used memory, i.e., into the area of programs, data, or intermediate results, either a hardware interruption of the processor under an impossible instruction (executing a "hash"), or an accidental control transfer into the memory area in the core memory will occur with probability close to one. One of the possible techniques to design the mechanism for separating accidental control transfers from the right (really programmed) control transfers is the known formalism of statement parentheses, i.e., the representation of executable operator sequence of the program in the form of blocks strictly nested one in another. If one has compiled in advance the description of parentheses structure in using the program pages for each of the tasks being solved, then it is sufficient to replace in all programs the direct control transfers from page into another page with accessing the system program BONDTO for control transfer analysis, which is especially designed for indicating in general a progress of the computing process along the respective parentheses structure. Then an accidental control transfer will not coincide with the indicated previous state of the processor, which fact will be determined by this special program with probability close to one. Realization of this mechanism requires choosing the memory distribution for the specific program only on the base of designing its strict logic block diagram in accordance with the principles of the structured programming (see [1, 2]).

An important instance for organizing the C-service is the case of calling the subroutine under the command JSR, i.e., the control transfer with return. For this case, the mechanism for separating accidental control transfers from the right ones must be as follows. AU subroutine calls must be replaced with the call to the system subroutine BONDSR with the indication of the required program address as the argument. Upon receiving the total information on arrangement of the call and required program in the core memory, the subroutine BONDSR checks the validity of calling the required subroutine, and then performs the direct call of this subroutine. Upon completing the operation of this subroutine, the validity of the control return is checked, and the control is returned to the continuation of the main program. Such a mechanism would allow to determine, with probability close to one, the accidental control transfers to subroutine bodies and the losses of control during the program execution.

Yet another kind of the accidental control transfer does not determined by all said mechanisms of the C-service. This is the control transfer forward or backward within the parentheses structure operating without its corruption at the moment. Such a failure leads, in the former case, to the super quick program execution (missing a part of operators), and in the latter case, to the program cycling. For protecting from such T-failures, the T-service must use three timers of the following kinds:

real-time clock of the microsecond scale (the PCM clock train);

clock of the millisecond scale, which forms the interruptions, e.g., each 20 ms;

system clock of the second scale with a battery power supply independent from power supply network, which system clock has the value of the least significant bit about 1 second and not less than 25-bit register of the second counter (i.e., designed for =3.14×10 sec/year).

Such a set of clock is necessary for ensuring a reliable hardware of the continuous time system service both in the case of failure of some of these clocks, and in the case of the network blackout. In the words following the supplement to the checksum of the page comprising the entrance to the parentheses structure with the monitored duration of the execution, the lower TSMALL and the upper TLARG boundaries for the duration of the execution of this structure should be placed. Then the system programs realizing the time service get the possibility to monitor the implementation of the progression charts of any events in the system from several tens of microseconds, i.e., the characteristic durations of program failure progression, up to tens months including intermediate durations at scales of milliseconds (characteristic actuation times of various electromechanical devices in the system with PCM), seconds (characteristics duration of dialogues with the personnel), and periodic events at intervals of hour, day, etc.

A general means for overcoming the occurred failure, after recognizing and registering its characteristics, must be a certain predetermined number of attempt to repeat the given branch of the computing process beginning from the nearest previous checkpoint, or restart point, which is specified by the nature of the occurred failure (the checkpoint in the closest analogue, the U.S. Pat. No. 5,911,040 A).

The method in accordance with the present invention is realized, as discussed above, in any system having a Program Computing Means (PCM). In such a means, the processor executes programs that are stored in the core memory of this processor. FIG. 1 shows schematically a general mechanism for func-tioning the PCM memory. As usual, this mechanism provides for loading some user program into the user memory area, starting the program, and performing the M-type, C-type, and T-type interruptions being occurred during execution of this program. Each of these interruptions leads to the start of respective handlings, which algorithms are shown in one of FIG. 2 to 6. Each of these drawings has the marking similar to the chessboard marking, which facilitates the identifi-ability of respective action in one or another algorithm. The alphabetic part of this marking (i.e., Latin letters in the column labels in the drawings) alters from one Figure to another, and the numerical part (i.e., the numbering of rows in the drawings) remains without change. Herewith, some actions in FIG. 2 to 6 are designated with Russian letters distinct from the Latin letters, as the steps referred to in the appended claims. FIG. 2 to 6 include the following acronyms: s/r—subroutine, c/t—control transfer, s_l—system log.

Figure 2:
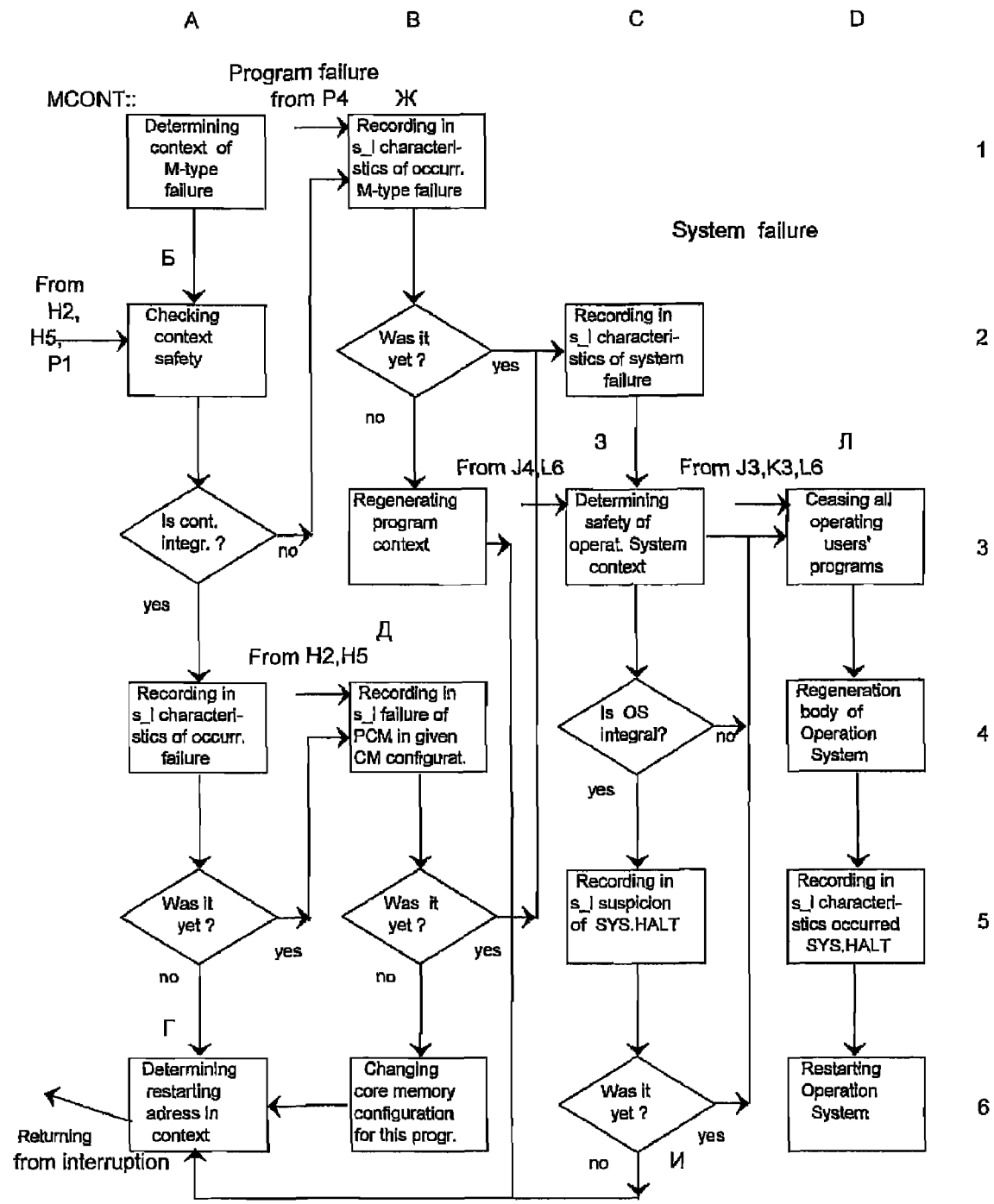
FIG. 2 is the flow chart of the PCM operation in the case of processing the M-type interruptions.

The flow-chart of the PCM functioning in the case of processing the M-type interruptions is shown in FIG. 2. The M-type interruption processing begins from determining the context of the M-type failure (block A1). After that, at the step B), the check is performed, as to whether the context of the program being executed has been saved (block A2). The result of this check (block A3) is recorded in the system log (block A4 in the case when the context is integral, block B1 in the case when the context has not been saved). If, at the step B), the context of the program being executed has been saved, then, after recording the characteristics of the happened failure in the system log (block A4), the check is performed, as to whether this failure happened previously (block A5). If the occurred failure did not happen previously, then, at the step T), a context restart point of the program being executed is determined (block A6), after which a re-execution (restart) of the program being executed is performed beginning from the restart point found at the step T).

If the context of the program being executed has been saved, and the occurred failure happened previously, then, after recording this fact in the system log as the PCM fault in the given configuration (block B4), the check is performed at the step JJ), as to whether such fault happened previously (block B5). If such fault did not happen previously, then the PCM configuration is changed for the program being executed (block B6), and the process proceeds to the mentioned step T), i.e., to the block A6 for determining the context restart point and for restarting the program being executed.

If, at the step B), it is recognized that the context of the program being executed has not been saved, then, after recording the characteristics of the occurred M-type failure in the system log (block B1), the check is performed at the step 5K), as to whether such failure happened previously (block B2). If such failure did not happen previously, then the context of the program being executed is regenerated (block B3), and the process proceeds to the mentioned step T), i.e., to the block A6 for determining the context restart point and for restarting the program being executed.

If at the step JJ) or at the step 3K) is determined that respective fault or failure did happen previously, then the characteristics of the happened system failure is recorded in the system log (block C1), and the check is performed at the step 3), as to whether the context of the PCM operating system has been saved (block C3). If the context of said operating system has been saved (block CA-), then this fact is recorded in the system log as a possible failure in the PCM operation (block C5), and the check is performed at the step H), as to whether such failure happened previously (block C6). If such failure did not happen previously, then the process proceeds to the mentioned step T). If it is determined at the step 3) that the context of said operating system has not been saved (block C4), or it is determined at the step H) that such failure in the PCM operation did happen previously (block C6), then, at the step JI), all programs running in the PCM are terminated abnormally (block D3), after which the body of said operating system is regenerated (block D4), the system failure is recorded in the system log (block D5), and said operating system is restarted (block D6).

It should be noted especially, that actions in the columns A and B in FIG. 2 are related to the program failure, and actions in the columns C and D are related to the system failure.

Figure 3:
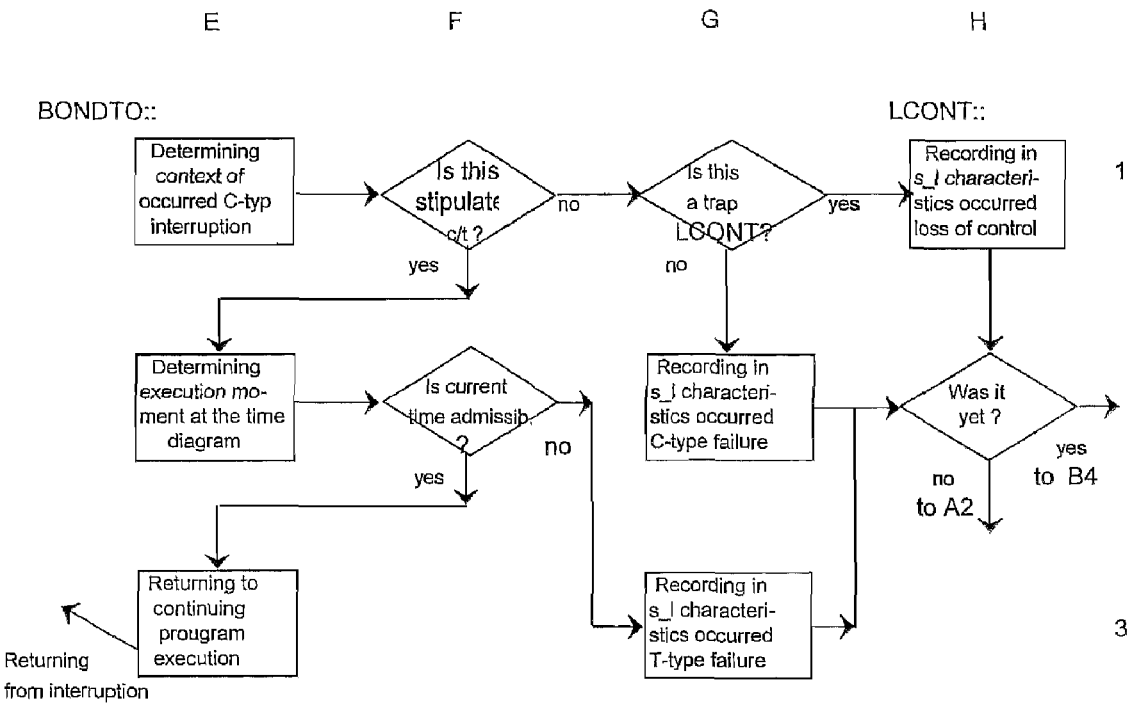
FIG. 3 is the flow chart of the PCM operation in the case of processing the C-ty[rho]e interruptions without addressing a routine.
Figure 4:
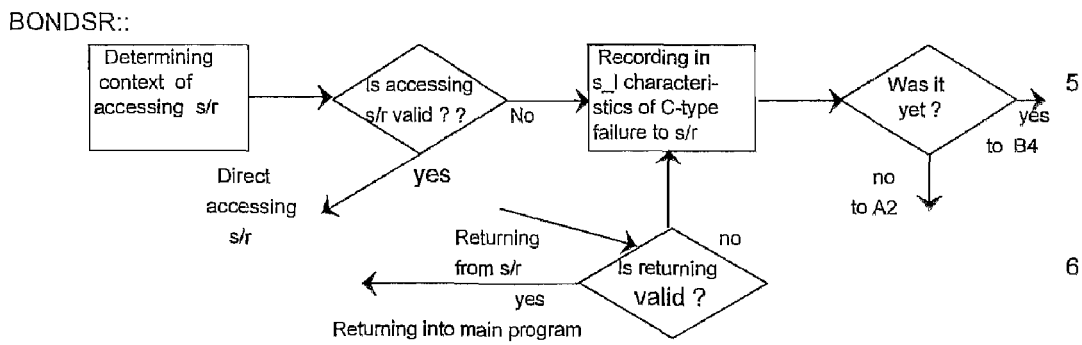
FIG. 4 is the flow chart of the PCM operation in the case of processing the C-type interruptions in the case of addressing a routine.

The flow-chart of the PCM functioning for processing the C-type interruptions in the case of control transfer is shown in FIG. 3, and in the case of accessing the subroutine is shown in FIG. 4. The C-type interruption processing begins from determining the fact, what kind of the C-type interruption has happened. Herewith, the context of the occurred C-type interruption (block E1 in FIG. 3), or the context of accessing the subroutine (block E5 in FIG. 4) is determined, depending on whether the control transfer in the program being executed or accessing the subroutine has happened.

In the case of control transfer (see block E1 in FIG. 3), the check is performed, as to whether this control transfer is the stipulated control transfer (block F1). If this control transfer is the stipulated one, then the execution point of the program being executed is found out at the time diagram thereof (block E2), and the check is performed, as to whether the current time is admissible (block F2). If the found execution point corresponds to the admissible current time, then the execution of the program being executed continues (block E3). If the found execution point does not correspond to the admissible current time, then this fact is recorded in the system log as the T-type failure (block G3), and the check is performed, as to whether such failure happened previously (block H2). If such failure did not happen previously, then the process proceeds to the step B) (see FIG. 2), and if such failure did happen previously, then the process proceeds to the step JX) (see FIG. 2).

But if (block F1) the control transfer is not stipulated, then the check is performed, as to whether this control transfer is a trap-command (block G1), i.e., is it a command of the control transfer according to the predetermined vector, with which command, when starting the PCM, is filled all the core memory un-used by the programs being executed. Depending on whether this control transfer command is the trap-command or not, either characteristics of the loss of control (block H1), or characteristics of the C-type failure (block G2) are recorded, respectively, in the system log, after which, in the both cases, the check is performed, as to whether such event happened previously (block H2). If such event did not happen previously, then the process proceeds to the step B) (see FIG. 2), and if such event did happen previously, then the process proceeds to the step JS) (see FIG. 2).

In the case of accessing the subroutine (see block E5 in FIG. 4), the check is performed, as to whether this accessing is valid (block F5), and if so, then this accessing is carried out, and when returning from this subroutine, the check is performed, as to whether this returning is valid (block G6), and if so, the step of returning to the program being executed is carried out. But if the check of validity of accessing the subroutine (block F5) or the check of validity of returning from the subroutine (block G6) brings to the negative result, then the C-type failure in the case of accessing the subroutine is recorded in the system log, and the check is performed, as to whether such failure happened previously (block H5). If such failure did not happen previously, then the process proceeds to the step B) (see FIG. 2), and if such failure did happen previously, then the process proceeds to the step JS) (see FIG. 2).

Figure 5:
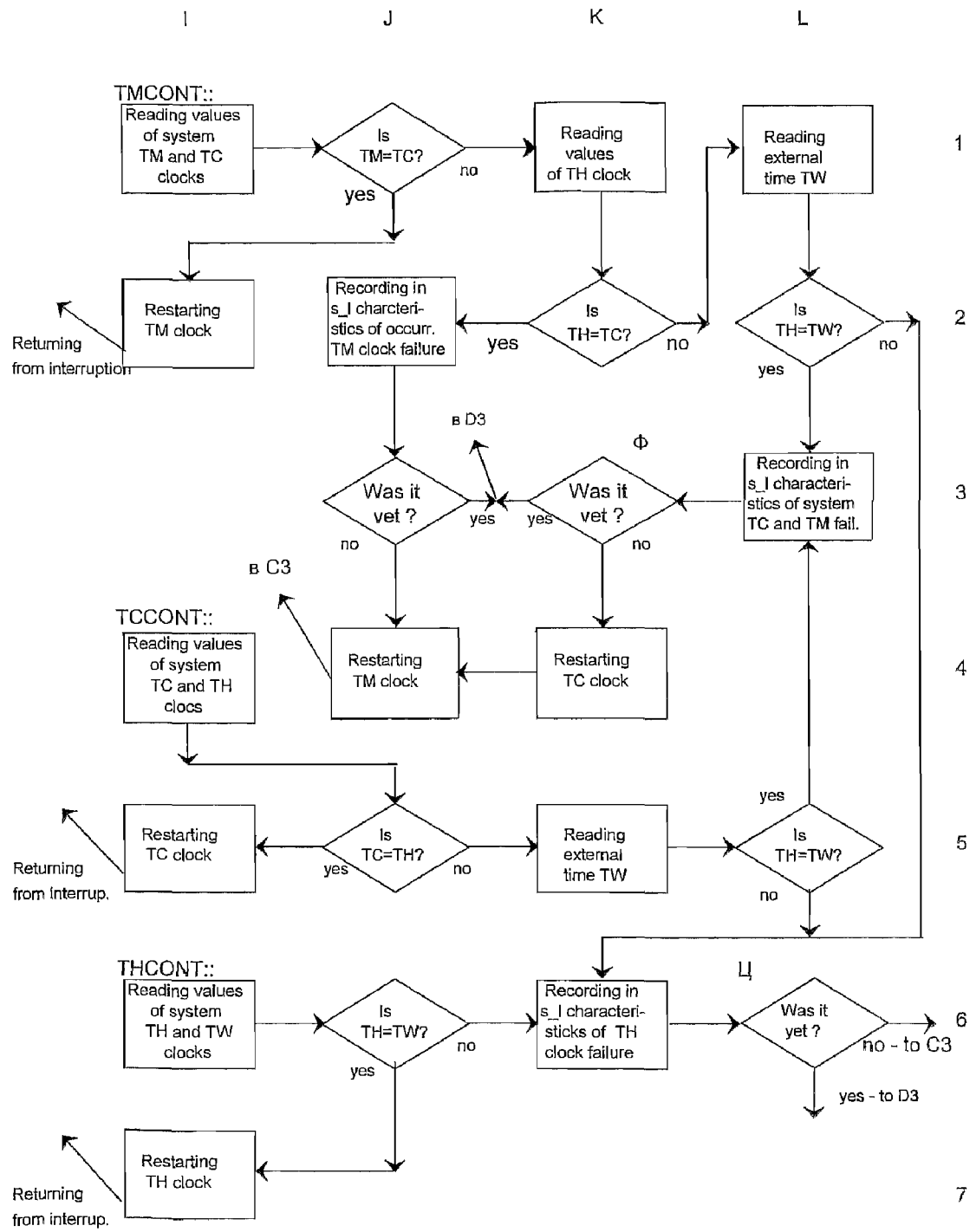
FIG. 5 is the flow chart of the PCM operation in the case of processing the T-type interruptions for the system time.

FIGS. 5 and 6 show flow-charts of the PCM functioning for processing the T-type interruptions for the system time and for the program time, respectively. A specific form of the T-type interruption processing depends on the fact, according to what clock's vector this interruption occurs. These clocks, i.e., at least three independent clock trains of different scales, are generated by the time interval sequence generators included in the PCM. The first of these trains (sequences), hereinafter referred to as the TM clock (from the phrase "time micro"), is the PCM clock train, i.e., it has time lengths about microseconds and even less (depending on the timing frequency of the processor being used), the second of these trains, hereinafter referred to as the TC clock (from the phrase "time centi"), has time lengths about milliseconds, and the third of these trains, hereinafter referred to as the TH clock (from the phrase "time hour"), has time lengths about seconds or minutes, as described above in the general concept of the method of the present invention. Specific values of the time lengths of all three indicated clocks are defined by both the design peculiarities of the PCM being used, and the peculiarities of the software being used in that PCM.

For processing the system time interruptions (FIG. 5) in the case of interruption according to the TM clock vector, first the values of the TM clock and TC clock are read (block T1), after which the check is performed, as to whether the values of the TM clock and TC clock coincide (block J1), and in the case of coincidence of the values of the TM clock and TC clock, the step of restarting the TM clock is carried out (block 12). But in the absence of coincidence of the values of thp TM clock and TC clock, the value of the TH clock is read (block K1), and coincidence of the values of the TC clock and TH clock is checked (block K2). If at this step the values of the TC clock and TH clock coincide, the TM clock failure is recorded in the system log (block J2), and at the step IT) the check is performed, as to whether such failure happened previously (block J3). If such failure did not happen previously, then the step of restarting the TM clock is carried out (block J4), after which the process proceeds to the step 3) (see FIG. 2), and if such failure did happen previously, then the process proceeds to the step JI) (see FIG. 2).

In the absence of coincidence of the values of the TC clock and TH clock, the value of the world astronomical clock, hereinafter referred to as the TW clock (from the phrase "time world"), is read (block L1), and coincidence of the values of the TH clock and TW clock is checked (block L2). If at this step the values of the TH clock and TW clock coincide, then the TC clock and TM clock failure is recorded in the system log (block L3), and the check is performed at the step [Phi]), as to whether such failure happened previously (block K3). If such failure did not happen previously, the step of restarting the TC clock is carried out (block (K4), then the step of restarting the TM clock is carried out (block J4), after which the process proceeds to the step 3) (see FIG. 2). But if the check at the step [Phi]) (block K3) determines that such failure did happen previously, the process proceeds to the step JI) (see FIG. 2).

In the case of interruption according to the TC clock vector, first the values of the TC clock and TH clock are read (block 14), after which the check is performed, as to whether the values of the TC clock and TH clock coincide (block J5), and in the case of coincidence of the values of the TC clock and TH clock, the step of restarting the TC clock is carried out (block 15). In the absence of coincidence of the values of the TC clock and TH clock, the value of the TW clock is read (block K5), and coincidence of the values of the TH clock and TW clock (block L5) is checked. If at this step the values of the TH clock and TW clock coincide, then the TC clock failure is recorded in the system log (block L3), and the process proceeds to the step [Phi]).

But if the values of the TH clock and TW clock do not coincide (block L5), then after recording the TH clock failure in the system log (block K6), the check is performed at the step LQ, as to whether such failure happened previously (block L6). If such failure did not happen previously, then the process proceeds to the step 3) (see FIG. 2), and if such failure did happen previously, the process proceeds to the step JI) (see FIG. 2).

In the case of interruption according to the TH clock vector, first the values of the TH clock and TW clock are read (block 16), after which the check is performed, as to whether the values of the TH clock and TW clock coincide (block J6), and in the case of coincidence of the values of the TH clock and TW clock, the step of restarting the TH clock is carried out (block 17). But if the values of the TH clock and TW clock do not coincide, then the TH clock failure is recorded in the system log (block K6), and the process proceeds to the step LQ (block L6).

Figure 6A:
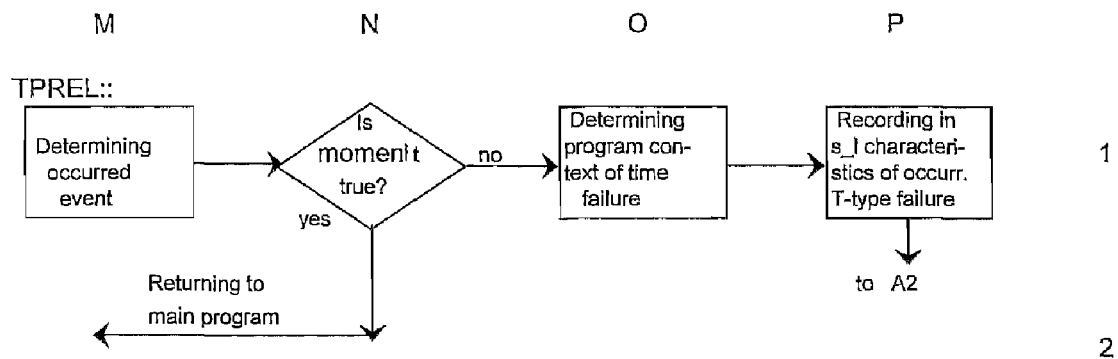
FIG. 6 is the flow chart of the PCM operation in the case of processing the M-type interruptions for the program time.
Figure 6B:
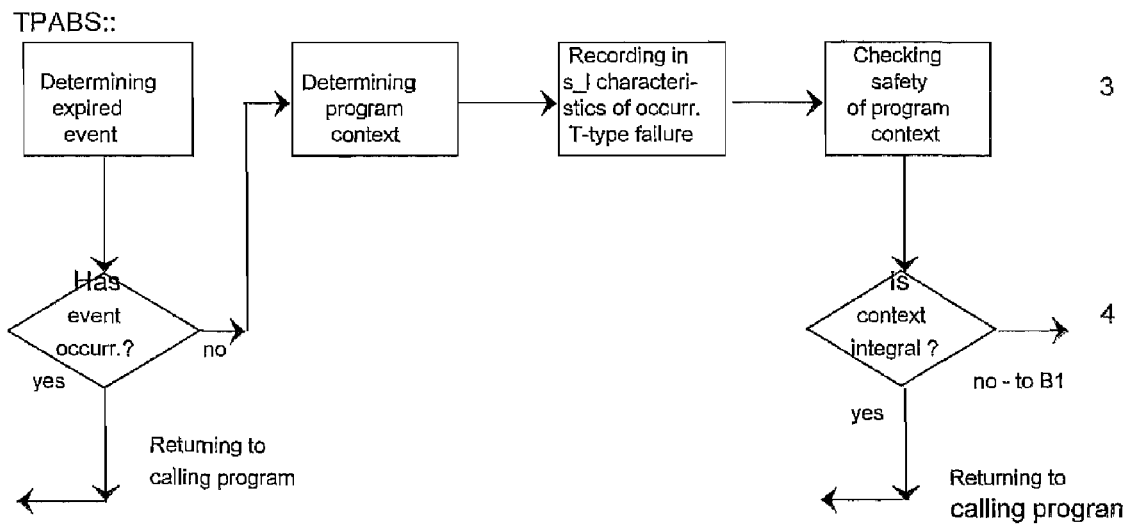

During a real operation of the user application programs with time events, there could be two methods for binding the event time diagrams to the current time. For time processes being controlled by the user program, these event time diagrams could be bound to the relative program time, and for events being not controlled, but called for by the user program, these event time diagrams could be bound to the absolute system time. These alternatives are shown in FIGS. 6a and 6b, respectively.

For the relative program event (block M1 in FIG. 6a) the validity of the moment of occurrence of the event is checked (block N1), and if this moment is valid, the step of returning to the program being executed is carried out. But if the moment of occurrence of that event is not valid, then the program context of the time error is determined (block O1), and after recording the occurred T-failure in the system log (block P1), the process proceeds to the step B) (see FIG. 2).

For the absolute program event (block M3 in FIG. 6b) the fact of occurrence of this event is determined (block M4), and if this event has been occurred, the step of returning to the program being executed is carried out. But if this event has not been occurred, the context of the program being executed is determined (block N3), and after recording the characteristics of this failure in the system log (block O3), the check is performed, as to whether the context of the program being executed has been saved (block P3). If the context of the program being executed has been saved (block P4), then the step of returning into the program being executed is carried out, and if the context of the program being executed has not been saved, then the process proceeds to the step}K) (see FIG. 2).

Thus, the method of the present invention ensures the maximum possible account of types of the occurred failures on order to respond to those failures. Herewith, in practice, any fault or failure in the program computing means is recognized in due time, which does not allow this fault or failure to move to the fault of the whole system used such program computing means. An exclusion from this affirmation are all possible disturbances of the time diagrams, which could, by definition of disturbance itself, be recognized only after termination of the time interval for occurrence of this event.

In conclusion of the specification of this invention, it should be noted that realization thereof does not depend on application peculiarities of the users' programs, and, in this respect, it is applicable for all purposes. At the same time, it is expedient to supplement the abstract monitoring mechanism with specific protections on the users' programs, appearing from the application peculiarities of the process being programmed. Yet one more important consequence of the all-purpose applicability of this invention is the reflexivity, i.e., self-applicability of the claimed method. In other words, this method is applicable also to the operating system realizing thereof.

[1]. D. Knuth. "The art of computer programming", v. 1, 2.3, "Addison-Wesley Publishing Company", 1968

[2]. N. Wirth. "Systematic programming. An introduction", "Prentice-Hall, inc.", New Jersey, 1973.

What is claimed is:

1. A method for ensuring the reliable operation of the program computing means (PCM) including at least:

a processor operating under the control of a predetermined operating system and intended for processing data under the control of at least one program being executed;

a core memory intended for storing said at least one program being executed and data being processed;

time interval sequence generators;

the method comprising steps of:

defining in advance at least one state of said program being executed different from the start and end states thereof, which state being hereinafter referred to as the restart point and intended for resuming the operation of said program being executed after a failure during execution thereof;

when executing, in the PCM, said program being executed, in the case of failure occurrence, determining, due to respective monitoring, the following failures in the PCM operation: a) an error in storing the core memory content, which error being hereinafter referred to as the M-type interruption and determined by checking a respective part of the core memory content; b) a control transfer to a wrong command, which transfer being hereinafter referred to as the C-type interruption and determined by monitoring the correctness of every control transfer in the processor; and c) various time interruptions being hereinafter referred to as the T-type interruptions determined by monitoring a run duration of a respective part of said program being executed and said predetermined operating system;

while processing a respective one of said interruption types and upon occurrence of anyone of the failures being recognizable, in the case of allowable conditions for continuing the operation, restarting the execution of said program being executed beginning with the nearest restart point of said program being executed preceding to this interruption;

if the determined failure appears again during the following attempts to restart said program being executed, stopping the execution of said program being executed and recording the presence of the respective failure during execution of said program being executed.

2. The method according to claim 1, wherein, in the case of occurrence of the interruption of any one of said types, the following steps being performed:

checking, at the step B), as to whether the context of the program being executed has been saved, and recording the result of this checking in the system log;

if, at the step B), it is determined that context of the program being executed has been saved, then after recording the characteristics of the occurred failure in the system log, checking, as to whether this failure happened previously;

if the occurred failure did not happened previously, then determining, at the step F), the context restart point of the program being executed, after which performing said restarted execution of the program being executed;

if the context of the program being executed has been saved, and the occurred failure happened previously, then recording, at the step ff), this fact as the fault of the PCM in the given configuration in the system log, and checking, as to whether such failure happened previously;

if such failure did not happen previously, changing the PCM configuration for the program being executed, and proceeding to said step T);

if, at the step B), it is determined that the context of the program being executed has not been saved, then recording, at the step JK), the characteristics of the occurred M-type failure, and checking, as to whether such failure happened previously;

if such failure did not happen previously, regenerating the context of the program being executed, and proceeding to said step T);

if, at the step JT) or at the step 5K), it is determined that the corresponding failure or fault did happen previously, then recording the characteristics of the occurred system fault in the system log, and checking, at the step 3), as to whether the context of the PCM operating system has been saved;

if the context of said operating system has been saved, then recording this fact as a possible failure in the PCM operation, and checking, at the step H), as to whether such failure happened previously;

if such failure did not happen previously, then proceeding to said step T);

if, at the step 3), it is determined that the context of the operating system has not been saved, or, at the step H), it is determined that such failure in the PCM operation did already happen, then terminating, at the step JI), abnormally all programs operating in the PCM, after which regenerating the body of said operating system, recording the system failure in the system log, and restarting said operating system.

3. The method according to claim 2, wherein, in the case of occurrence of the M-type interruption, during processing thereof:

determining the context of the occurred M-type interruption, after which performing said step B).

4. The method according to claim 2, wherein, in the case of occurrence of the M-type interruption, during processing thereof:

determining the context of the occurred C-type interruption, or the context of accessing the subroutine depending on whether the control transfer in the program being executed or accessing the subroutine has happened, respectively;

in the case of the control transfer:

checking, as to whether this control transfer is the stipulated control transfer;

if this control transfer is the stipulated one, then finding out the execution point of said program being executed at the time diagram thereof, and checking, as to whether the current time is admissible;

if the found execution point corresponds to the admissible current time, then continuing the execution of the program being executed;

if the found execution point does not correspond to the admissible current time, then recording this fact as the T-type failure in the system log, and checking, as to whether such failure happened previously;

if such failure did not happen previously, then proceeding to said step E);

if such failure did happen previously, then proceeding to said step JS);

if said control transfer is not stipulated, then checking, as to whether this control transfer is a command of the control transfer according to the predetermined vector, hereinafter referred to as the trap-command, with which command, when starting the PCM, is filled all the core memory unused by the programs being executed;

depending on whether this control transfer command is the trap-command or not, recording either characteristics of the loss of control, or characteristics of the C-ty[rho]e failure, respectively, in the system log, after which checking, as to whether such event happened previously;

if such event did not happen previously, then proceeding to said step E), and if such event did happen previously, then proceeding to said step JS);

in the case of accessing the subroutine:

checking, as to whether this accessing is valid, and if so, then carrying out this accessing, and when returning from this subroutine, checking, as to whether this returning is valid, and if so, returning to said program being executed;

if the check of validity of accessing the subroutine or the check of validity of returning from the subroutine brings to the negative result, then after re-cording the C-type failure in the case of accessing the subroutine in the system log, checking, as to whether such failure happened previously;

if such failure did not happen previously, then proceeding to said step B), and if such failure did happen previously, then proceeding to said step JX).

5. The method according to claim 2, wherein said time interval sequence generators generate at least three independent clock trains of different scales, the first of which trains, hereinafter referred to as the TM clock, is the PCM clock train, the second of which trains, hereinafter referred to as the TC clock, has time lengths about milliseconds, and the third of which trains, hereinafter referred to as the TH clock, has time lengths about seconds; and wherein, in the case of occurrence of the T-type interruption, during processing thereof, performing the following steps of:

for the system time:

in the case of interruption according to the TM clock vector:

checking the coincidence of the values of the TM clock and TC clock;

in the case of coincidence of the values of the TM clock and TC clock, carrying out the step of restarting the TM clock;

in the absence of coincidence of the values of the TM clock and TC clock, checking the coincidence of the values of the TC clock and TH clock;

in the case of coincidence of the values of the TC clock and TH clock, recording the TM clock failure in the system log, and, at the step II), checking, as to whether such failure happened previously;

if such failure did not happen previously, then carrying out the step of restarting the TM clock, after which proceeding to said step 3);

if such failure did happen previously, then proceeding to said step JI);

in the absence of coincidence of the values of the TC clock and TH clock, checking coincidence of the values of the TH clock and the world astronomical clock, hereinafter referred to as the TW clock;

if, at this step, the values of the TH clock and TW clock coincide, then recording the TC clock and TM clock failure in the system log, and checking, at the step [Phi]), as to whether such failure happened previously;

if such failure did not happen previously, carrying out the step of restarting the TC clock, then carrying out the step of restarting the TM clock, after which proceeding to said step 3);

if the check at the step [Phi]) determines that such failure did happen previously, proceeding to the step JI);

in the case of interruption according to the TC clock vector:

checking coincidence of the values of the TC clock and TH clock;

in the case of coincidence of the values of the TC clock and TH clock, carrying out the step of restarting the TC clock;

in the absence of coincidence of the values of the TC clock and TH clock, checking coincidence of the values of the TH clock and TW clock;

if, at this step, the values of the TH clock and TW clock coincide, then recording the TC clock failure in the system log, and proceeding to said step [Phi]);

in the absence of coincidence of the values of the TH clock and TW clock, recording the TH clock failure in the system log, and checking, at the step L1), as to whether such failure happened previously;

in the case of coincidence of the values of the TH clock and TW clock, recording the TC clock failure in the system log, and checking, at the step [Phi]), as to whether such failure happened previously;

if such failure did not happen previously, then proceeding to said step 3), and if such failure did happen previously, then proceeding to said step JI);

in the case of interruption according to the TH clock vector:

checking coincidence of the values of the TH clock and TW clock;

in the case of coincidence of the values of the TH clock and TW clock, carrying out the step of restarting the TH clock;

in the absence of coincidence the values of the TH clock and TW clock, recording the TH clock failure in the system log, and proceeding to said step U1);

for the program time:

determining the kind of the occurred program event, whether absolute or relative;

for the relative program event:

checking the validity of the moment of occurrence of the event, and if this moment is valid, carrying out the step of returning to the program being executed;

if the moment of occurrence of that event is not valid, then determining the program context of the time error, and after recording the occurred T-failure in the system log, proceeding to said step B);

for the absolute program event:

determining the fact of occurrence of this event, and if this event has been occurred, carrying out the step of returning to the program being executed;

if this event has not been occurred, determining the context of the program being executed, and after recording the characteristics of this failure in the system log, checking, as to whether the context of the program being executed has been saved;

if the context of the program being executed has been saved, then carrying out the step of returning into the program being executed, if the context of the program being executed has not been saved, then proceeding to said step 5K).

* * * * *